(12) United States Patent
Lai et al.

(10) Patent No.: US 6,665,494 B1
(45) Date of Patent: Dec. 16, 2003

(54) CASING OF DIGITAL CAMERA

(75) Inventors: Jr-Ang Lai, Taichung (TW); Wei-Long Chen, Hsin Chu (TW); Chan-Mao Wang, Taichung (TW)

(73) Assignee: STL Vision Technology Co., Ltd., Taichung (TW)

( * ) Notice: Subject to any disclaimer, the term of this patent is extended or adjusted under 35 U.S.C. 154(b) by 0 days.

(21) Appl. No.: 10/347,757

(22) Filed: Jan. 21, 2003

(51) Int. Cl.$^7$ ................................................ G03B 17/02
(52) U.S. Cl. ...................................................... 396/535
(58) Field of Search ............................ 396/535, 6, 541, 396/27, 29

(56) References Cited

U.S. PATENT DOCUMENTS

| | | | | |
|---|---|---|---|---|
| 3,777,639 A | * | 12/1973 | Lange | 396/541 |
| 4,383,743 A | * | 5/1983 | Nozawa et al. | 396/29 |
| 6,023,592 A | * | 2/2000 | Yokoyama et al. | 396/541 |
| 6,553,188 B2 | * | 4/2003 | Tanaka | 396/535 |

* cited by examiner

Primary Examiner—Christopher Mahoney
(74) Attorney, Agent, or Firm—Alan Kamrath; Rider Bennett, LLP

(57) ABSTRACT

A camera casing includes a front shell, a rear shell, a lateral shell, a first fastener for connecting the front shell with the rear shell and a second fastener for combining the front shell, the rear shell and the lateral shell with one another. The front shell includes a portion inserted into the lateral shell, and the rear shell includes a portion inserted into the lateral shell. The front shell includes a cylinder formed thereon and formed with a threaded internal face. The rear shell includes a cylinder formed thereon and formed with a threaded internal face. The first fastener is a threaded bolt engaged with the threaded internal face of the cylinder of the front shell and the threaded internal face of the cylinder of the rear shell. The first shell defines a cavity for receiving a cover for concealing the first fastener. The front shell includes a lip extending from an end thereof and defining a hole. The rear shell includes a lip extending from an end thereof and defining a hole. The lateral shell includes a hollow block formed thereon, and separated from the lower portion of the lateral shell by means of a gap, and formed with a threaded internal face. The second fastener is a threaded bolt inserted through the hole defined in the lip of the front shell and the hole defined in the lip of the rear shell into engagement with the threaded internal face of the hollow block of the lateral shell.

20 Claims, 5 Drawing Sheets

CASING OF DIGITAL CAMERA

BACKGROUND OF INVENTION

1. Field of Invention

The present invention relates to a casing of a digital camera.

2. Related Prior Art

FIG. 5 shows a conventional casing of a digital camera. This conventional casing includes a front shell 1 and a rear shell 2 secured to the front shell 1 by means of two screws 3 on the top and two screws 4 on a side. Additional screws may be employed on the bottom and the other side to secure the front shell 1 to the rear shell 2. More screws used means more securely the shells 1 and 2 are bonded. However, it takes quite some time to drive such screws. It takes more time to form holes in the front shell 1 or the rear shell 2 for engagement with the screws 3 and 4.

The present invention is therefore intended to obviate or at least alleviate the problems encountered in the prior art.

SUMMARY OF INVENTION

It is the primary objective of the present invention to provide a camera casing that can be made at a low cost.

According to the present invention, a camera casing includes a front shell, a rear shell, a lateral shell, a first fastener for connecting the front shell with the rear shell and a second fastener for combining the front shell, the rear shell and the lateral shell with one another.

The front shell includes a portion inserted into the lateral shell, and the rear shell includes a portion inserted into the lateral shell.

In an aspect, the front shell includes a cylinder formed thereon and formed with a threaded internal face. The rear shell defines a hole. The first fastener is a threaded bolt inserted through the hole defined in the rear shell into engagement with the threaded internal face of the cylinder formed on the front shell. The second shell defines a cavity for receiving a cover in order to conceal the first fastener.

In a second aspect, the front shell defines a hole. The rear shell includes a cylinder formed thereon and formed with a threaded internal face. The first fastener is a threaded bolt inserted through the hole defined in the front shell into engagement with the threaded internal face of the cylinder formed on the rear shell. The first shell defines a cavity for receiving a cover in order to conceal the first fastener.

In a third aspect, the front shell includes a cylinder formed thereon and formed with a threaded internal face. The rear shell includes a cylinder formed thereon and formed with a threaded internal face. The first fastener is a threaded bolt engaged with the threaded internal face of the cylinder of the front shell and the threaded internal face of the cylinder of the rear shell. One of the first and second shells defines a cavity for receiving a cover in order to conceal the first fastener.

The front shell includes a lip extending from an end thereof and defining a hole. The rear shell includes a lip extending from an end thereof and defining a hole. The lateral shell includes a hollow block formed thereon, and separated from the lower portion of the lateral shell by a gap, and formed with a threaded internal face. The second fastener is a threaded bolt inserted through the bole defined in the lip of the front shell and the hole defined in the lip of the rear shell into engagement with the threaded internal face of the hollow block of the lateral shell.

The front shell includes an edge. The rear shell includes an edge for engagement with the edges of the front shell. The edge of the front shell is made with reduced thickness. The edge of the rear shell is made with reduced thickness.

Other objectives, advantages, and novel features of the invention will become more apparent from the following detailed description when taken in conjunction with the attached drawings.

BRIEF DESCRIPTION OF DRAWINGS

The present invention will be described through detailed illustration of the preferred embodiment referring to the attached drawings wherein.

DETAILED DESCRIPTION OF PREFERRED EMBODIMENT

Referring to FIGS. 1–4, a casing of a digital camera according to the preferred embodiment of the present invention is shown.

Figure 1:
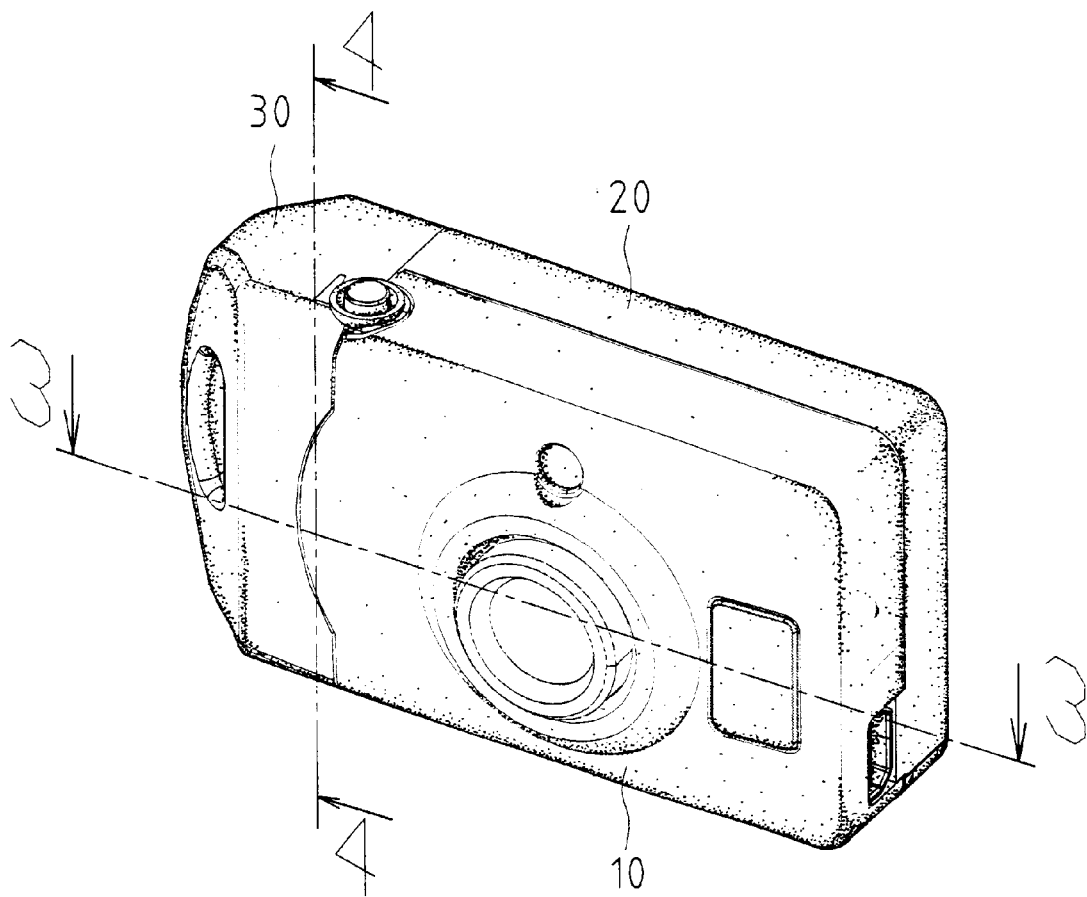
FIG. 1 is a perspective view of a casing of a digital camera according to the preferred embodiment the present invention.

Referring to FIG. 1, the casing includes a front shell 10, a rear shell 20 and a lateral shell 30 for connecting the front shell 10 with the rear shell 20.

Figure 2:
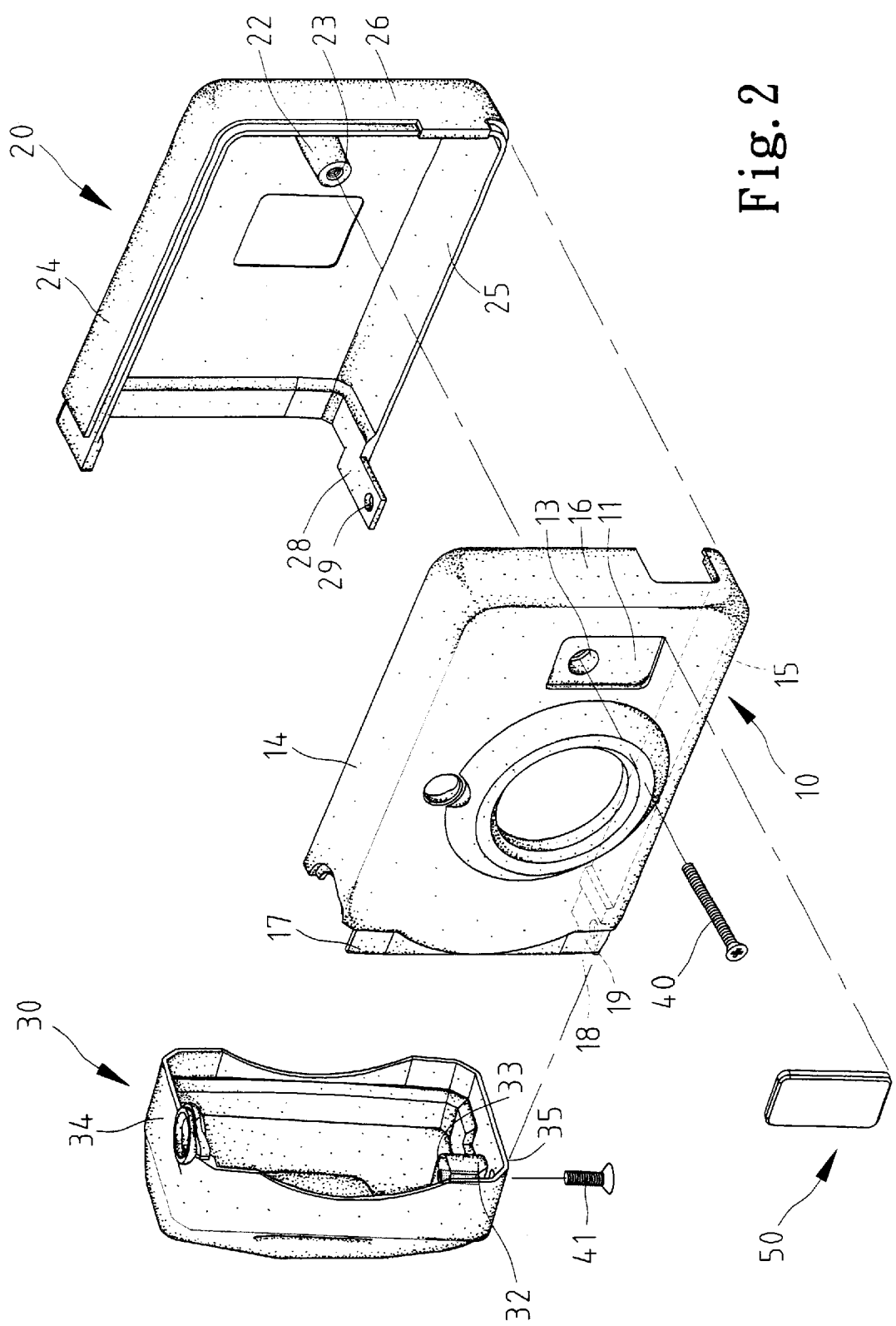
FIG. 2 is an exploded view of the casing shown in FIG. 1.

Referring to FIG. 2, the front shell 10 includes a central portion (not numbered), an upper portion 14 perpendicular to the central portion, a lower portion 15 perpendicular to the central portion and a lateral portion 16 perpendicular to the central portion. The upper portion 14 lower portion 15 and lateral portion 16 of the front shell 10 all include an edge of reduced thickness. The front shell 10 includes a cavity 11 defined in a front face of the central portion thereof and a hollow cylinder 12 formed on a rear face of the central portion thereof corresponding to the cavity 11. The cylinder 12 includes a threaded internal face 13. The central portion of the front shell 10 includes a lip 17 extending from an end thereof. The lower portion 15 of the front shell 10 includes a lip 18 extending from an end thereof. A hole 19 is defined in the lip 18.

The rear shell 20 includes a central portion (not numbered), an upper portion 24 perpendicular to the central portion thereof, a lower portion 25 perpendicular to the central portion thereof and a lateral portion 26 perpendicular to the central portion thereof. The upper portion 24, lower portion 25 and lateral portion 26 of the rear shell 20 all include an edge of reduced thickness. The rear shell 20 includes a hollow cylinder 22 formed on a front face of the central portion thereof. The hollow cylinder 22 includes a threaded internal face 23. The central portion of the rear shell 20 includes a lip 27 extending from an end thereof. The lower portion 25 of the rear shell 20 includes a lip 28 extending from an end thereof. A hole 29 is defined in the lip 28.

The lateral shell 30 includes a central portion (not numbered), an upper portion 34 perpendicular to the central portion thereof, a lower portion 35 perpendicular to the central portion thereof, a front portion (not numbered) perpendicular to the central portion thereof and a rear portion (not numbered) perpendicular to the central portion thereof. The upper portion 34 of the lateral shell 30 defines a hole (not numbered) through which a button (not numbered) of the digital camera can extend. A hollow block 32 is formed on the central portion of the lateral shell 30. The hollow block 32 is separated from the lower portion 35 of the lateral shell 30 by means of a gap (not numbered). The hollow block 32 includes a threaded internal face 33.

In assembly, the edges of reduced thickness of the upper portion 14, lower portion 15 and lateral portion 16 of the front shell 10 are engaged with, the edges of reduced thickness of the upper portion 24, lower portion, 25 and lateral portion 26 of the rear shell 20, respectively.

Figure 3:
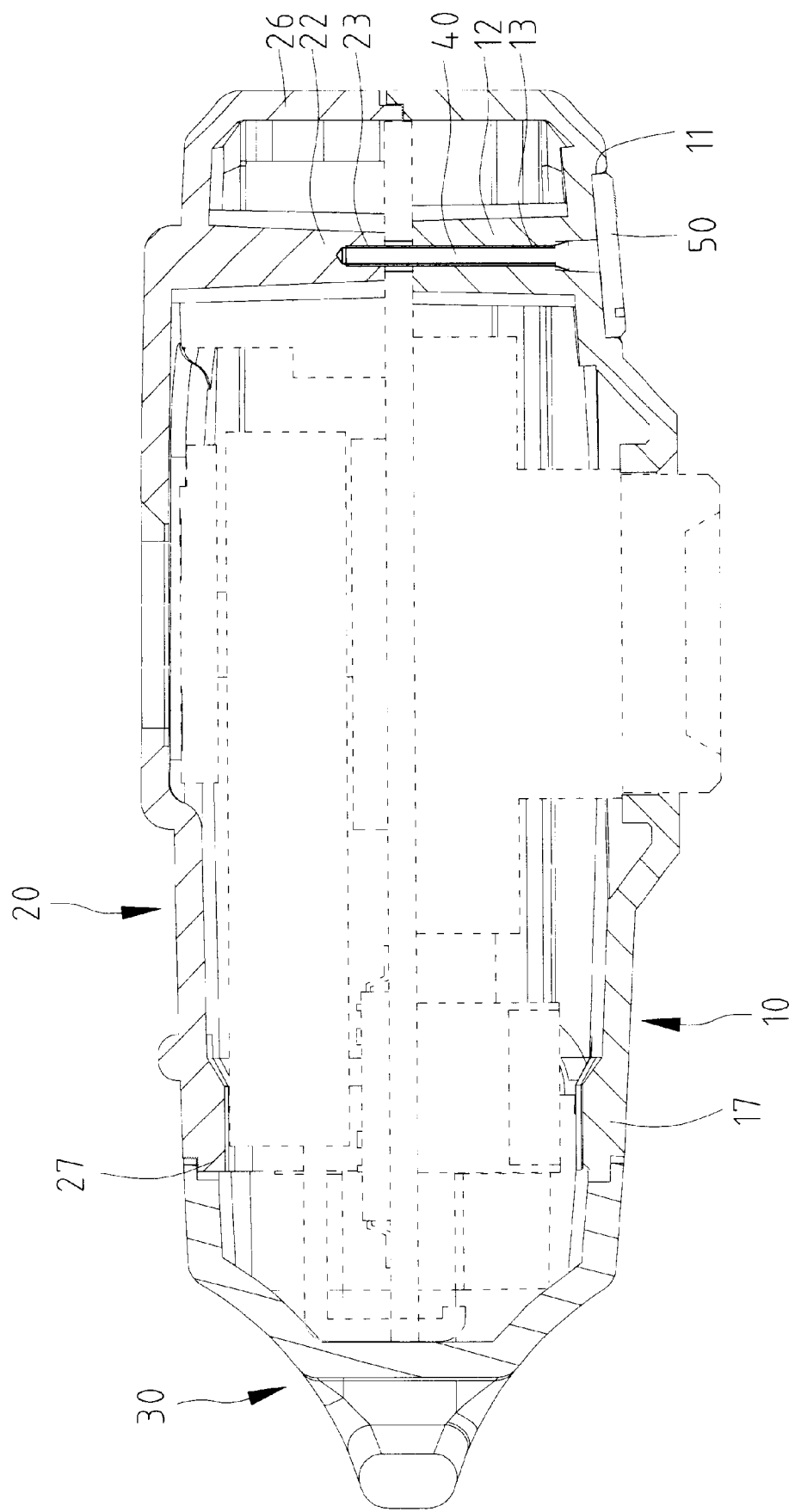
FIG. 3 is a cross-sectional view taken along a line 3—3 in FIG. 1.

Referring to FIG. 3, the hollow cylinder 12 of the front shell 10 is aligned with the hollow cylinder 22 of the rear shell 20. A threaded bolt 40 is engaged with the threaded internal face 13 of the hollow cylinder 12 of the front shell 10 and the threaded internal face 23 of the hollow cylinder 22 of the rear shell 20. A cover 50 is fit into the cavity 11 for concealing the threaded bolt 40.

Figure 4:
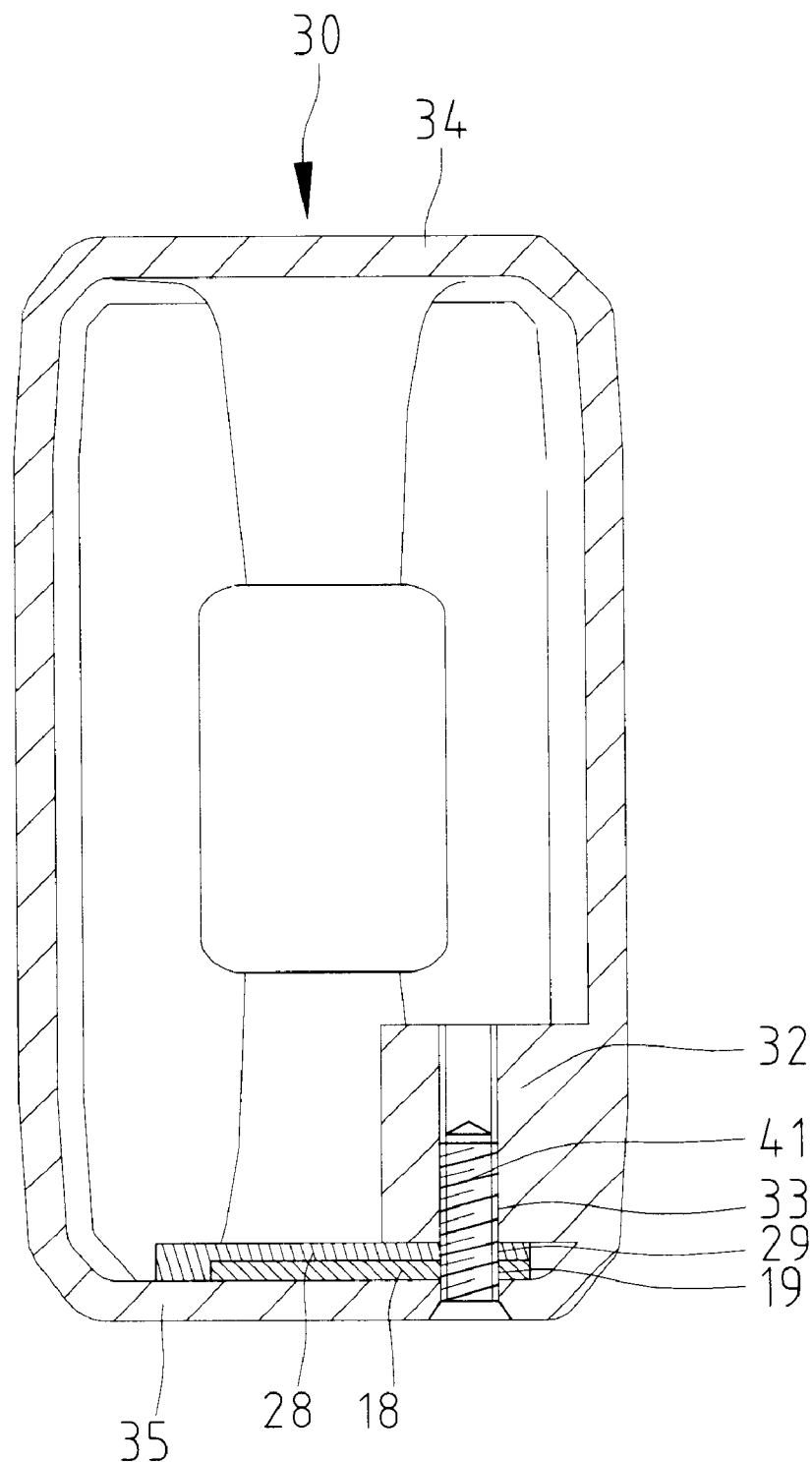
FIG. 4 is a cross-sectional view taken along a line 4—4 in FIG. 1.
Figure 5:
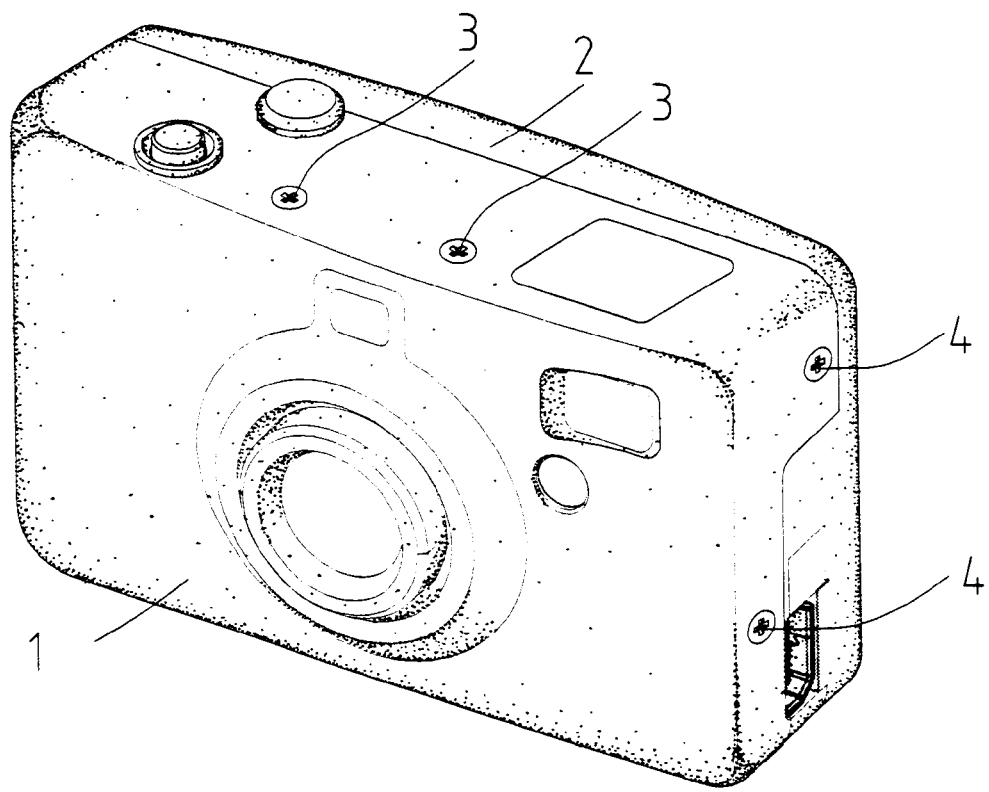
FIG. 5 is a perspective view of a of a digital camera according to the prior art.

Referring to FIG. 4, the lips 17 and 18 of the front shell 10 and the lips 27 and 28 of the rear shell 20 are inserted into the lateral shell 30. The lip 18 of the front shell 10 and the lip 28 of the rear shell 20 are located in the gap between the hollow block 32 and the lower portion 35 of the lateral shell 30. The lip 18 of the front shell 10 and the lip 28 of the rear shell 20 are overlapped. A threaded bolt 41 is inserted through the holes 19 and 29 into engagement with the threaded internal face 33 of the hollow block 32. Thus, the front shell 10, the rear shell 20 and the lateral shell 30 are firmly combined with one another.

The present invention has been described through detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A camera casing including a front shell; a rear shell; a lateral shell; a first fastener for connecting the front shell with the rear shell; and a second fastener for combining the front shells, the rear shell and the lateral shell with one another, wherein the front shell includes a portion inserted into the lateral shell, and the rear shell includes a portion inserted into the lateral shell.

2. The camera casing according to claim 1 wherein the front shell includes an edge, and the rear shell includes an edge for engagement with the edge of the front shell.

3. The camera casing according to claim 2 wherein the edge of the front shell is made with reduced thickness.

4. The camera casing according to claim 2 wherein the edge of the rear shell is made with reduced thickness.

5. A camera casing including a front shell; a rear shell; a lateral shell; a first fastener for connecting the front shell with the rear shell; and a second fastener for combining the front shell, the rear shell and the lateral shell with one another, wherein the front shell includes a cylinder formed thereon and formed with a threaded internal face, and the rear shell defines a hole, and the first fastener is a threaded bolt inserted through the hole defined in the rear shell into engagement with the threaded internal face of the cylinder formed on the front shell.

6. The camera casing according to claim 5 including a cover, wherein the second shell defines a cavity for receiving the cover in order to conceal the first fastener.

7. The camera casing according to claim 5 wherein the front shell includes an edge, and the rear shell includes an edge for engagement with the edge of the front shell.

8. The camera casing according to claim 7 wherein the edge of the front shell is made with reduced thickness.

9. The camera casing according to claim 7 wherein the edge of the rear shell is made with reduced thickness.

10. A camera casing including a front shell; a rear shell; a lateral shell; a first fastener for connecting the front shell with the rear shell; and a second fastener for combining the front shell, the rear shell and the lateral shell with one another, wherein the front shell defines a hole, and the rear shell includes a cylinder formed thereon and formed with a threaded internal face, and the first fastener is a threaded bolt inserted through the hole defined in the front shell into engagement with the threaded internal face of the cylinder formed on the rear shell.

11. The camera casing according to claim 10 including a cover, wherein the first shell defines a cavity for receiving the cover in order to conceal the first fastener.

12. The camera casing according to claim 10 wherein the front shell includes an edge, and the rear shell includes an edge for engagement with the edge of the front shell.

13. A camera casing including a front shell; a rear shell; a lateral shell; a first fastener for connecting the front shell with the rear shell; and a second fastener for combining the front shell, the rear shell and the lateral shell with one another, wherein the front shell includes a cylinder formed thereon and formed with a threaded internal face, and the rear shell includes a cylinder formed thereon and formed with a threaded internal face, and the first fastener is a threaded bolt engaged with the threaded internal face of the cylinder of the front shell and the threaded internal face of the cylinder of the rear shell.

14. The camera casing according to claim 13 including a cover, wherein one of the first and second shells defines a cavity for receiving the cover in order to conceal the first fastener.

15. The camera casing according to claim 13 wherein the front shell includes an edge, and the rear shell includes an edge for engagement with the edge of the front shell.

16. The camera casing according to claim 15 wherein the edge of the front shell is made with reduced thickness.

17. A camera casing including a front shell; a rear shell; a lateral shell; a first fastener for connecting the front shell with the rear shell; and a second fastener for combining the front shell, the rear shell and the lateral shell with one another, wherein the front shell includes a lip extending from an end thereof and defining a hole, the rear shell includes a lip extending from an end thereof and defining a hole, the lateral shell includes a hollow block formed thereon, and separated from the lower portion of the lateral shell by means of a gap, and formed with a threaded internal face, and the second fastener is a threaded bolt inserted through the hole defined in the lip of the front shell and the hole defined in the lip of the rear shell into engagement with the threaded internal face of the hollow block of the lateral shell.

18. The camera casing according to claim 17 wherein the front shell includes an edge, and the rear shell includes an edge for engagement with the edge of the front shell.

19. The camera casing according to claim 18 wherein the edge of the front shell is made with reduced thickness.

20. The camera casing according to claim 18 wherein the edge of the rear shell is made with reduced thickness.

* * * * *